(12) United States Patent
Wang

(10) Patent No.: US 6,926,824 B2
(45) Date of Patent: Aug. 9, 2005

(54) PURIFIER WITH MOLECULAR-REARRANGING DEVICE

(76) Inventor: Jen-Chieh Wang, 2nd Fl., No. 31-1, Alley 452, Ta-Yih Rd., Taipei (TW)

( * ) Notice: Subject to any disclaimer, the term of this patent is extended or adjusted under 35 U.S.C. 154(b) by 0 days.

(21) Appl. No.: 10/639,447

(22) Filed: Aug. 13, 2003

(65) Prior Publication Data
US 2005/0035063 A1 Feb. 17, 2005

(51) Int. Cl.[7] ............................. F01N 3/00; C02F 1/48
(52) U.S. Cl. ........................ 210/222; 55/DIG. 30; 55/466; 60/274; 96/1
(58) Field of Search ................ 210/222, 223, 210/695; 55/DIG. 30, 466; 60/274, 275; 96/1, 2

(56) References Cited

U.S. PATENT DOCUMENTS 4,706,455 A * 11/1987 Johnsson ............... 55/DIG. 30
4,979,364 A * 12/1990 Fleck ........................ 60/274
6,139,737 A * 10/2000 Gizowski ................. 210/222

* cited by examiner

Primary Examiner—David A. Reifsnyder
(74) Attorney, Agent, or Firm—Rosenberg, Klein & Lee

(57) ABSTRACT

A purifier with molecular-rearranging device mainly includes a hollow tubular holder, a tubular molecular-rearranging device positioned in the tubular holder, a tubular isolating layer positioned in a bore of the tubular molecular-rearranging device, and two caps respectively having a through hole closed to two ends of the tubular holder. The purifier may be put around an exhaust pipe or a pipe for transferring liquid, so that a radiated magnetic field is produced by magnetic lines of the molecular-rearranging device and earth poles to magnetize and rearrange molecules of exhaust or liquid flown through the pipe, making the exhaust or liquid filtered and purified to reduce air and water pollution.

1 Claim, 3 Drawing Sheets

PURIFIER WITH MOLECULAR-REARRANGING DEVICE

FIELD OF THE INVENTION

The present invention relates to a purifier, and more particularly to a purifier with molecular-rearranging device adapted to purify exhaust to reduce air pollution, and to purify drinking water and wastewater to reduce water pollution.

BACKGROUND OF THE INVENTION

Effects of magnetic lines existed on the earth and all kinds of substances have been scientifically proved. As a matter of fact, more than 98% of magnetic particles in the air are diametrically smaller than 1 micrometer (micron). These magnetic particles are almost not affected or carried away by airflow when they diffuse from a local area, but are affected by magnetic lines produced by surrounding electric fields.

The above-mentioned principle about magnetic lines has been widely applied to water filters and magnetic-energy-based activators to produce activated and magnetized water. Up to date, however, the magnetic lines have not been applied to the treatment of exhaust discharge from cars, motorcycles, etc. Therefore, it is tried by the inventor to develop a purifier that employs the principle of magnetic lines to magnetize the exhaust of vehicle to achieve the effects of purifying and filtering the exhaust and reduced air pollution.

SUMMARY OF THE INVENTION

A primary object of the present invention is to provide a purifier with molecular-rearranging device adapted to mount around, for example, an exhaust pipe on a vehicle to serve as an exhaust filter. The purifier mainly includes a hollow tubular holder, a tubular molecular-rearranging device positioned in the tubular holder, a tubular isolating layer made of, for example, an insulating asbestos material and positioned in a bore of the tubular molecular-rearranging device, and two caps respectively having a through hole for closing to two ends of the tubular holder, so that the exhaust pipe is extended through the purifier via the two holes on the two caps. With the thermal insulating effect provided by the asbestos material and a radiated magnetic field produced by magnetic lines of the molecular-rearranging device and earth poles, molecules of the exhaust discharged via the exhaust pipe is magnetizes and rearranged, making the exhaust filtered and purified to reduce air pollution.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
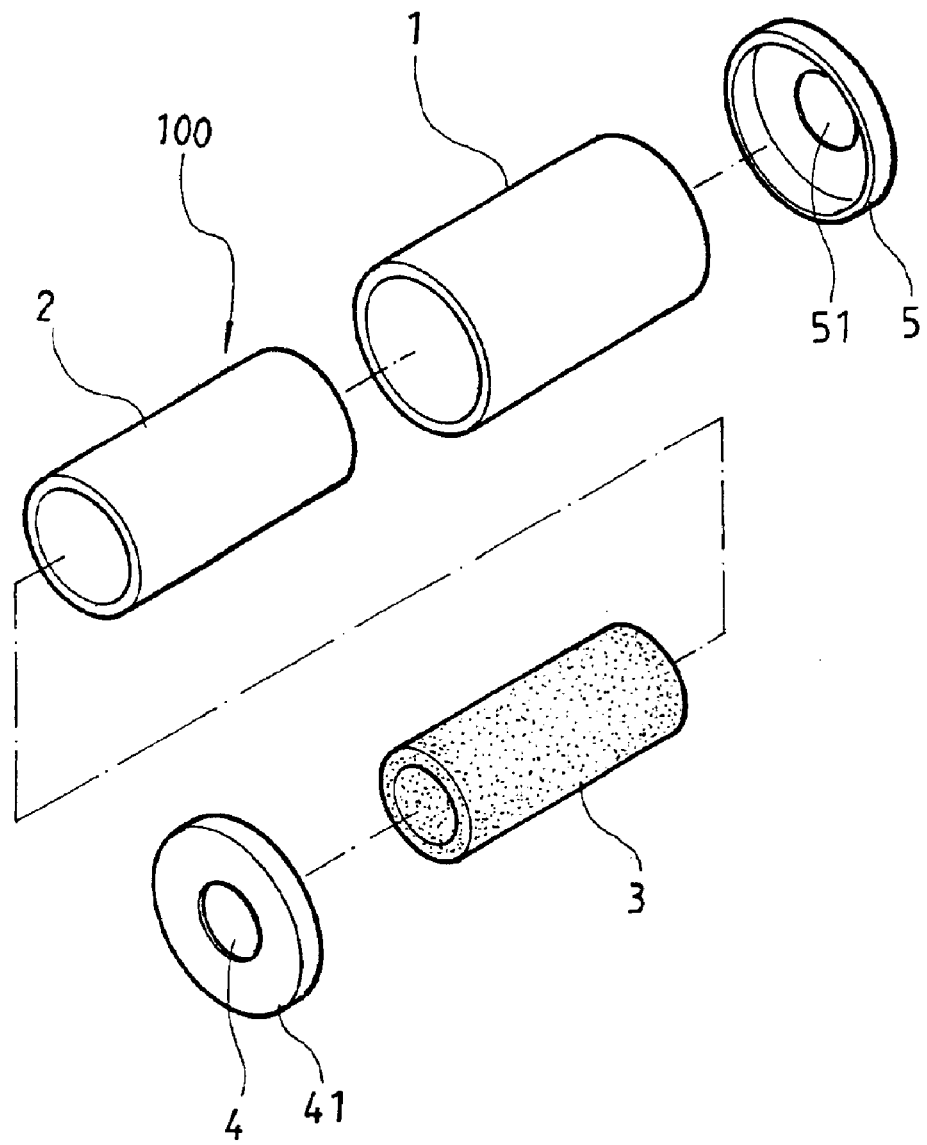
FIG. 1 is an exploded perspective view of the present invention.
Figure 2:
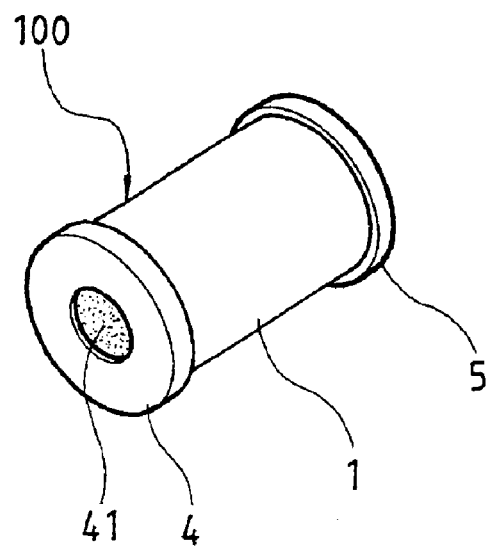
FIG. 2 is an assembled perspective view of the present invention.

Please refer to FIGS. 1 and 2 that are exploded and assembled perspective views, respectively, of a purifier with molecular-rearranging device according to the present invention. As shown, the purifier, which is generally denoted by reference number 100, mainly includes a hollow tubular holder 1, a tubular molecular-rearranging device 2 set in the hollow tubular holder 1, a tubular isolating layer 3 made of, for example, an insulating asbestos material and positioned in a bore of the molecular-rearranging device 2, and two caps 4, 5 respectively having a through hole 41, 51 corresponding to an inner diameter of the tubular isolating layer 3. After the tubular molecular-rearranging device 2 and the insulating material of the isolating layer 3 are sequentially positioned into the tubular holder 1, the two caps 4, 5 are separately firmly closed and riveted to two ends of the tubular holder 1.

The purifier 100 may be mounted on a car or a motorcycle to serve as an exhaust filtering device. To do so, simply putting the purifier 100 around an exhaust pipe of the car or motorcycle, so that the exhaust pipe is extended through the through holes 41, 51 of the two caps 4, 5 and located in a bore of the isolating layer 3. Magnetic lines produced by the molecular-rearranging device 2 together with earth poles produce a radiated magnetic field, which causes molecules of exhaust discharged by the car or motorcycle to be magnetized and rearranged and thereby achieves the purpose of purifying and filtering the exhaust. With the purifier mounted on the exhaust pipe of a vehicle, air pollution caused by exhaust may be reduced to achieve the purpose of environment protection.

Figure 3:
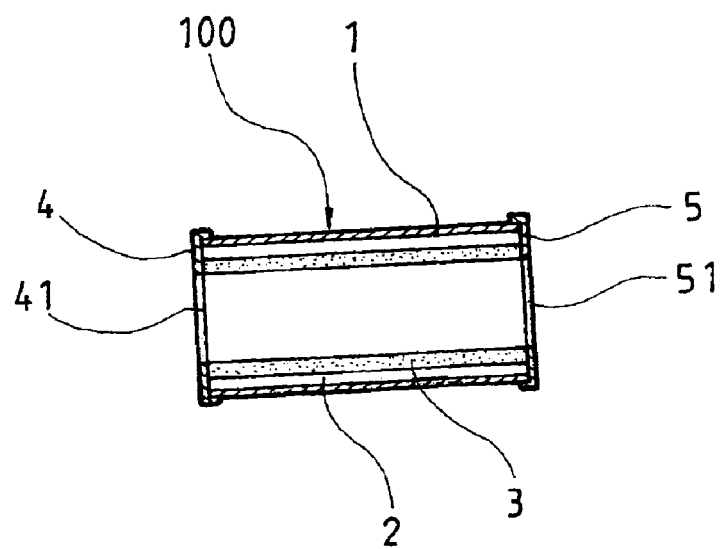
FIG. 3 is a sectional view of the present invention.

FIG. 3 is a sectional view of the present invention in an assembled state. It can be clearly seen from FIG. 3, the insulating asbestos of the isolating layer 3 and the molecular-rearranging device 2 are located in the tubular holder 1 and held in place by the two caps 4, 5, so that the exhaust pipe of vehicle may be extended through the bore of the isolating layer 3 via the through holes 41, 51 of the caps 4, 5. The isolating layer 3 is adapted to isolate the heat contained in the exhaust from the molecular-rearranging device 2 and the tubular holder 1, and the molecular-rearranging device 2 is adapted to magnetize and accordingly, rearrange molecules of exhaust or waste gas discharged via the exhaust pipe. Through magnetization and molecular rearrangement, the exhaust is purified as having been filtered to reduce air pollution possibly caused by the exhaust.

Figure 4:
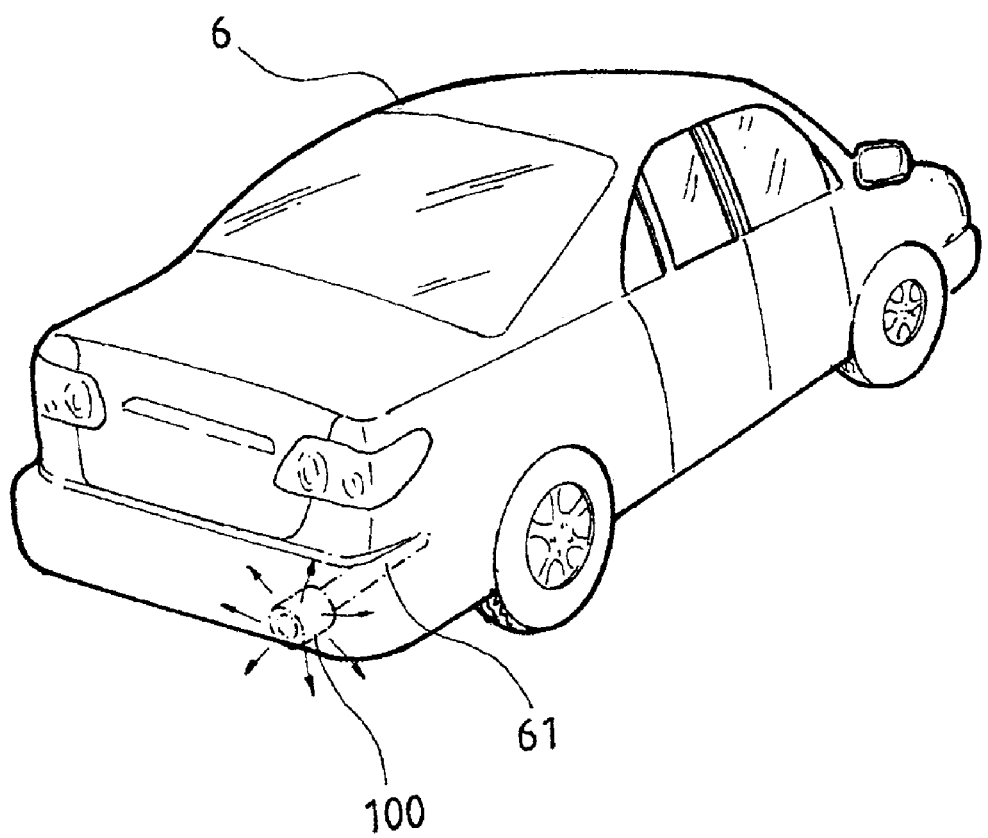
FIG. 4 shows the use of the present invention on an exhaust pipe on a vehicle.

FIG. 4 shows the purifier 100 of the present invention serves as an exhaust filtering device for mounting around an outer end of an exhaust pipe 61 of a vehicle 6. Exhaust discharged by the vehicle 6 when the latter is moving will pass the purifier 100 and be filtered through magnetization and molecular rearrangement to reduce air pollution and achieve the purpose of environment protection.

The purifier of the present invention may be mounted on any type of pipelines in the same manner. For example, the purifier 100 may be mounted around a water pipe to magnetize and rearrange molecules of water flowing through the pipe, so that the water is magnetized and activated.

Tests have been conducted at Taipei Vehicle Registration and Inspection Office for exhaust discharged from an exhaust pipe of vehicle before and after mounting the purifier of the present invention. The following table shows some values obtained from the tests, wherein EP represents "Environment Protection":

| Types of Gas Tested | Before Mounting | After Mounting | 3rd-phase EP Standard | 4th-phase EP Standard |
|---|---|---|---|---|
| CO | 1.33% | 0.25% | 4.5% | 1.2% |
| $CO_2$ | 9.6% | 10.4% | above 6% | above 6% |
| HC | 104 ppm | 54 ppm | 1200 ppm | 220 ppm |

From the above values, it is proven exhaust discharged from the exhaust pipe mounted with the purifier of the present invention has a purification degree far above the $4^{th}$-phase EP standards. That is, the purifier of the present invention is highly effective in its purifying ability.

In brief, the present invention provides a purifier having a molecular-rearranging device and an isolating layer positioned in a tubular holder for mounting on an exhaust pipe on a vehicle to magnetize and filter exhaust discharged via the exhaust pipe and thereby reduces environmental pollution caused by the exhaust.

What is claimed is:

1. A molecular-rearranging magnetic purifier device comprising:

a hollow tubular holder having a pair of opposing open ends, a substantially cylindrical holder inner surface, and a device length;

a tubular molecular-rearranging magnetic having a substantially cylindrical magnet inner surface, a substantially cylindrical magnet outer surface, a magnet length substantially equal to said device length, and positioned so that said outer magnet surface is in substantial contiguity with said holder inner surface;

a tubular isolating layer having a substantially cylindrical isolator outer surface, a substantially cylindrical isolating tube inner diameter, an isolating tube length substantially equal to said device length, and positioned so that said outer isolator surface is in substantial contiguity with said magnet inner surface; and, a pair of end caps each having a through hole formed therethrough with a diameter substantially equal to said isolating tube inner diameter, and with each end cap fixedly positioned on one of said opposing ends of said hollow tubular holder;

wherein said tubular isolating layer and said magnet and said holder are all co-axially aligned, and the isolating layer has an inner bore with a bore diameter substantially equal to said isolating tube inner diameter and aligned with said through holes and adapted to receive a pipe partially extended therethrough whereby a liquid or an exhaust flowing through said pipe having said purifier mounted thereon is purifier when molecules of said liquid or said exhaust are rearranged by a plurality of magnetic forces produced by said molecular-rearranging magnet.

* * * * *